(12) United States Patent
Templeman et al.

(10) Patent No.: US 10,365,041 B2
(45) Date of Patent: Jul. 30, 2019

(54) EXTRUDED POLYCARBONATE STICKER FOR SPACING WOOD

(71) Applicant: DSV Holdings, LLC, Osage Beach, MO (US)

(72) Inventors: Steven W. Templeman, Lake Ozark, MO (US); Scott W. Templeman, Carthage, MO (US)

(73) Assignee: DSV Holdings LLC, Osage Beach, MO (US)

( * ) Notice: Subject to any disclaimer, the term of this patent is extended or adjusted under 35 U.S.C. 154(b) by 300 days.

(21) Appl. No.: 15/407,466

(22) Filed: Jan. 17, 2017

(65) Prior Publication Data

US 2017/0120496 A1   May 4, 2017

Related U.S. Application Data

(62) Division of application No. 15/183,786, filed on Jun. 16, 2016, now Pat. No. 9,851,148.

(Continued)

(51) Int. Cl.
*B29C 48/16* (2019.01)
*F26B 25/18* (2006.01)
(Continued)

(52) U.S. Cl.
CPC ............ *F26B 25/185* (2013.01); *B29B 13/06* (2013.01); *B29C 35/0805* (2013.01);
(Continued)

(58) Field of Classification Search
CPC . B29B 13/06; B29C 35/0805; B29C 47/0004; B29C 47/0028; B29C 47/0061;
(Continued)

(56) References Cited

U.S. PATENT DOCUMENTS 3,849,286 A * 11/1974 Brandt .................. B29C 47/882
                                                        204/165
3,900,957 A    8/1975 Denton et al.
(Continued)

FOREIGN PATENT DOCUMENTS

WO    2009105253 A2    8/2009

OTHER PUBLICATIONS

Brown, Lawrence D., "Dry Kiln Sticker Repair Costs and Procedures", 15th Meeting of the Western Dry Kiln Clubs, 1963.
(Continued)

*Primary Examiner* — Christina A Johnson
*Assistant Examiner* — Xue H Liu
(74) *Attorney, Agent, or Firm* — Martin & Associates, LLC; Derek P. Martin

(57) ABSTRACT

A sticker for spacing wood is extruded from an alloy that includes polycarbonate resin and polysulfone resin. The sticker can have a variety of different configurations, including a top surface that includes contact points that have an area substantially smaller than the area of the top surface, a single or multiple internal longitudinal hallow chambers separated by multiple reinforcing members, longitudinal external grooves that allow airflow, lateral external grooves that intersect the longitudinal external grooves, curved sides for a version where the stickers are placed manually, and substantially straight sides for a version where the stickers are placed by a machine. A method for manufacturing the sticker includes pulling an extrusion with a puller that includes a plurality of teeth that provide a first plurality of lateral grooves running substantially perpendicular to a longitudinal axis of the extrusion in a top and bottom surface of the extrusion.

11 Claims, 13 Drawing Sheets

Related U.S. Application Data

(60) Provisional application No. 62/230,912, filed on Jun. 18, 2015.

(51) Int. Cl.

| | | |
|---|---|---|
| *B29C 48/00* | (2019.01) | |
| *B29C 48/11* | (2019.01) | |
| *B29C 48/90* | (2019.01) | |
| *B29C 48/88* | (2019.01) | |
| *B29B 13/06* | (2006.01) | |
| *B29C 35/08* | (2006.01) | |
| *B29K 69/00* | (2006.01) | |
| *B29K 81/00* | (2006.01) | |
| *B29K 105/16* | (2006.01) | |
| *B29K 507/04* | (2006.01) | |
| *B29K 509/08* | (2006.01) | |
| *B29K 105/00* | (2006.01) | |

(52) U.S. Cl.
CPC ........ *B29C 48/002* (2019.02); *B29C 48/0022* (2019.02); *B29C 48/0023* (2019.02); *B29C 48/022* (2019.02); *B29C 48/11* (2019.02); *B29C 48/16* (2019.02); *B29C 48/903* (2019.02); *B29C 48/9115* (2019.02); *B29C 2035/0838* (2013.01); *B29K 2069/00* (2013.01); *B29K 2081/06* (2013.01); *B29K 2105/0032* (2013.01); *B29K 2105/0094* (2013.01); *B29K 2105/16* (2013.01); *B29K 2507/04* (2013.01); *B29K 2509/08* (2013.01); *B29K 2995/002* (2013.01); *B29K 2995/0063* (2013.01); *B29K 2995/0077* (2013.01); *B29K 2995/0082* (2013.01); *B29K 2995/0089* (2013.01); *F26B 2210/16* (2013.01)

(58) Field of Classification Search
CPC . B29C 47/0066; B29C 47/0069; B29C 47/04; B29C 47/882; B29C 47/903; B29C 47/90; B29C 2035/0838
USPC ........................................................ 264/151
See application file for complete search history.

(56) References Cited

U.S. PATENT DOCUMENTS

| | | | |
|---|---|---|---|
| 4,199,870 A | 4/1980 | Arsenault | |
| 4,508,592 A * | 4/1985 | Kowalski | ............... B29B 13/06 159/2.1 |
| 4,663,860 A | 5/1987 | Beall | |
| 4,788,777 A | 12/1988 | Davis | |
| 5,345,695 A | 9/1994 | Graham | |
| 5,813,137 A | 9/1998 | Townsend | |
| 6,134,803 A | 10/2000 | Gilchrist et al. | |
| 6,517,926 B1 | 2/2003 | Therrien et al. | |
| RE38,118 E | 5/2003 | Townsend | |
| 7,003,898 B2 | 2/2006 | Aaron | |
| 7,926,199 B2 | 4/2011 | Aaron | |
| 2005/0065263 A1* | 3/2005 | Chung | ................... C08K 5/092 524/445 |
| 2007/0101608 A1 | 5/2007 | Sundholm | |
| 2008/0058858 A1* | 3/2008 | Smith | ....................... A61F 5/08 606/199 |
| 2010/0308493 A1* | 12/2010 | Sehnal | ............... B29C 47/0023 264/176.1 |
| 2012/0047844 A1 | 3/2012 | Walker | |

OTHER PUBLICATIONS

Denig et al, "Drying Hardwood Lumber", USDA Forest Service Forest Products Laboratory General Technical Report FPL-GTR-118, 2000.

Rash, James K., "Engineered Kiln Stickers—A New Way to Save Costs", Chemicals Division Simpson Timber Company, Portland, Oregon, 1973.

Peabody et al., "Plastic Stickers for the Kiln Drying Operation", Portland Industrial Plastics Company, 1971.

Teesdale, L.V., "The Kiln Drying of Southern Yellow Pine Lumber", US Dept. of Agriculture, Jan. 1930.

Hendess et al., "Pipe and Tubing Extrusion", The SPE Guide on Extrusion Technology and Troubleshooting, Society of Plastics Engineers, 2001.

* cited by examiner

| Extrusion Specifications | Units | | ASTM Standard |
|---|---|---|---|
| | English | Metric | |
| Tensile Break Strength | > 9,000 PSI | > 62.1 MPa | D638 |
| Elongation at Break | 110-130% | | |
| Flexural Strength | > 13,500 PSI | > 93.0 MPa | D790 |
| Flexural Modulus | > 350,000 PSI/min | > 2.41 GPa/min | |
| Modulus of Elasticity | > 350,000 PSI | > 2.41 GPa | |
| Compressive Strength | > 12,500 PSI | > 86.2 MPa | D695 |
| Izod Impact Strength | 12-16 ft-lb/in | 640-850 J/m | D256 |
| Melt Flow Index | 3 to 6 (Code 2) | | Not Applicable |
| Specific Gravity | 1.22 to 1.3 | | Not Applicable |

FIG. 25

EXTRUDED POLYCARBONATE STICKER FOR SPACING WOOD

BACKGROUND

1. Technical Field

This disclosure generally relates to stickers used to stack lumber for drying, and more specifically relates to an extruded polycarbonate lumber sticker and process for manufacturing the same.

2. Background Art

Lumber is typically sawn from a tree when the tree is green. Green lumber must be dried before it can be used. It is well-known to stack green lumber into layers separated by sticks known in the art as "stickers," which provide spaces between the layers of lumber that allow the lumber to dry properly. Many different kinds of stickers have been developed and used over the years. The most common stickers are wooden sticks that have a square or slightly rectangular cross-section. The problem with these stickers is they have a limited life and must be replaced after a relatively small number of drying cycles. The typical life of a wood sticker is 8-15 drying cycles.

One type of wooden sticker known in the art is made of Ipê wood (also called Brazilian walnut), which is taken from trees in the rain forests of Central and South America. Stickers made of Ipê wood are used because they are very dense and therefore have a longer life than stickers made of other types of wood, lasting as long as 30-40 cycles. However, the use of Ipê wood for stickers is contributing to deforestation of the Central and South American rain forests. It would be preferable to use other materials for stickers to prevent over-harvesting of certain slow-growth trees, especially those in the rain forests, for wooden stickers.

Many different types of stickers that are made of plastic have been developed. For example, the following United States Patents all show various stickers that are made of plastic: U.S. Pat. Nos. 4,788,777; 5,345,695; 6,517,926; and 7,926,199. The stickers in these patents have different configurations, but each has some features that are not desirable, such as being heavier than they need to be, not providing a surface that grips the wood, and having a configuration that required injection molding instead of extruding. Thus, there is a need for a sticker that does not have these undesirable features.

BRIEF SUMMARY

A sticker for spacing wood is extruded from an alloy that includes polycarbonate resin and polysulfone resin. The sticker can have a variety of different configurations, including a top surface that includes contact points that have an area substantially smaller than the area of the top surface, a single or multiple internal longitudinal hollow chambers separated by multiple reinforcing members, longitudinal external grooves that allow airflow, lateral external grooves that intersect the longitudinal external grooves, curved sides for a version where the stickers are placed manually, and substantially straight sides for a version where the stickers are placed by a machine. A method for manufacturing the sticker includes pulling an extrusion with a puller that includes a plurality of teeth that provide a first plurality of lateral grooves running substantially perpendicular to a longitudinal axis of the extrusion in a top and bottom surface of the extrusion.

The sticker comprises an extruded body made of an alloy of polycarbonate resin and polysulfone resin, the extruded body comprising: a plurality of substantially hollow longitudinal internal chambers; a top surface comprising: a first plurality of longitudinal ridges that provide a first contact area having a first area substantially smaller than a total area of the top surface; and a first plurality of longitudinal grooves between the first plurality of longitudinal ridges; a bottom surface comprising: a second plurality of longitudinal ridges that provide a second contact area having a second area substantially smaller than a total area of the bottom surface; and a second plurality of longitudinal grooves between the second plurality of longitudinal ridges. The sticker provides the advantage of being very strong and durable with a relatively small contact area that will provide increased airflow and more even drying and is therefore less likely to stain the wood.

The top surface of the sticker further comprises a first plurality of lateral grooves running substantially perpendicular to the first plurality of longitudinal grooves to provide a knurled top surface comprising a first plurality of bumps in a first plurality of rows along a length of the top surface.

The bottom surface of the sticker further comprises a second plurality of lateral grooves running substantially perpendicular to the second plurality of longitudinal grooves to provide a knurled bottom surface comprising a plurality of bumps in a second plurality of rows along a length of the bottom surface.

The sticker comprises an extruded body made of an alloy of polycarbonate resin, 10-20% polysulfone resin by weight, 1-2% carbon black by weight, and 10-20% of glass fibers by weight, the extruded body comprising: a plurality of substantially hollow longitudinal internal chambers; a top surface comprising: a first plurality of longitudinal ridges that provide a first contact area having a first area substantially smaller than a total area of the top surface; a first plurality of longitudinal grooves between the first plurality of longitudinal ridges; and a first plurality of lateral grooves running substantially perpendicular to the first plurality of longitudinal grooves to provide a knurled top surface comprising a first plurality of bumps in a first plurality of rows along a length of the top surface; a bottom surface comprising: a second plurality of longitudinal ridges that provide a second contact area having a second area substantially smaller than a total area of the bottom surface; a second plurality of longitudinal grooves between the second plurality of longitudinal ridges; and a second plurality of lateral grooves running substantially perpendicular to the second plurality of longitudinal grooves to provide a knurled bottom surface comprising a plurality of bumps in a plurality of rows along a length of the bottom surface; wherein the tensile break strength of the extruded body is at least 9,000 pounds per square inch (PSI) (62.1 megapascal (MPa)); wherein the elongation of a sample of the extruded body at break during a test of the tensile break strength is 110-130%; wherein the flexural strength of the extruded body is at least 13,500 pounds per square inch (PSI) (93.0 megapascal (MPa)); wherein the flexural modulus of the extruded body is at least 350,000 pounds per square inch (PSI) per minute (2.41 gigapascal (GPa) per minute); wherein the modulus of elasticity for the extruded body is 350,000 PSI (2.41 gigapascal (GPa)); wherein the compressive strength of the extruded body is at least 12,500 pounds per square inch (PSI) (86.2 megapascal (MPa)); wherein the Izod impact strength for the extruded body is in the range of 12-16 ft-lb per inch (640-850 Joules per meter); wherein the melt flow index for the alloy is from 3 to 6; and wherein the specific gravity for the extruded body is 1.22 to 1.3. The sticker provides the advantage of being very strong and durable with a relatively small contact area that will provide increased airflow and more even drying and is therefore less likely to stain the wood.

A method for manufacturing a sticker for spacing wood comprises: providing an alloy comprising polycarbonate resin, and polysulfone resin that is at least 10% of the alloy by weight; drying the alloy until the moisture content of the alloy is less than 0.02%; injecting carbon black into the dried alloy as the dried alloy is fed into an extruder; the extruder extruding the alloy into an extrusion; passing the extrusion through multiple sizers in a liquid cooling tank; passing the extrusion through a wiping gasket in the liquid cooling tank into an air drying area; pulling the extrusion with a puller that includes a plurality of teeth that provide a first plurality of lateral grooves running substantially perpendicular to a longitudinal axis of the extrusion in a top and bottom surface of the extrusion; and cutting the extrusion to at least one specified length. The method provides a very economical way to produce the sticker in a way that assures the quality of different batches of stickers over time.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 25 is a table showing suitable specifications for the extruded sticker.

DETAILED DESCRIPTION

A sticker for spacing wood is extruded from an alloy that includes polycarbonate resin and polysulfone resin. The sticker can have a variety of different configurations, including a top surface that includes contact points that have an area substantially smaller than the area of the top surface, a single or multiple internal longitudinal hallow chambers separated by multiple reinforcing members, longitudinal external grooves that allow airflow, lateral external grooves that intersect the longitudinal external grooves, curved sides for a version where the stickers are placed manually, and substantially straight sides for a version where the stickers are placed by a machine. A method for manufacturing the sticker includes pulling an extrusion with a puller that includes a plurality of teeth that provide a first plurality of lateral grooves running substantially perpendicular to a longitudinal axis of the extrusion in a top and bottom surface of the extrusion.

Figure 1:
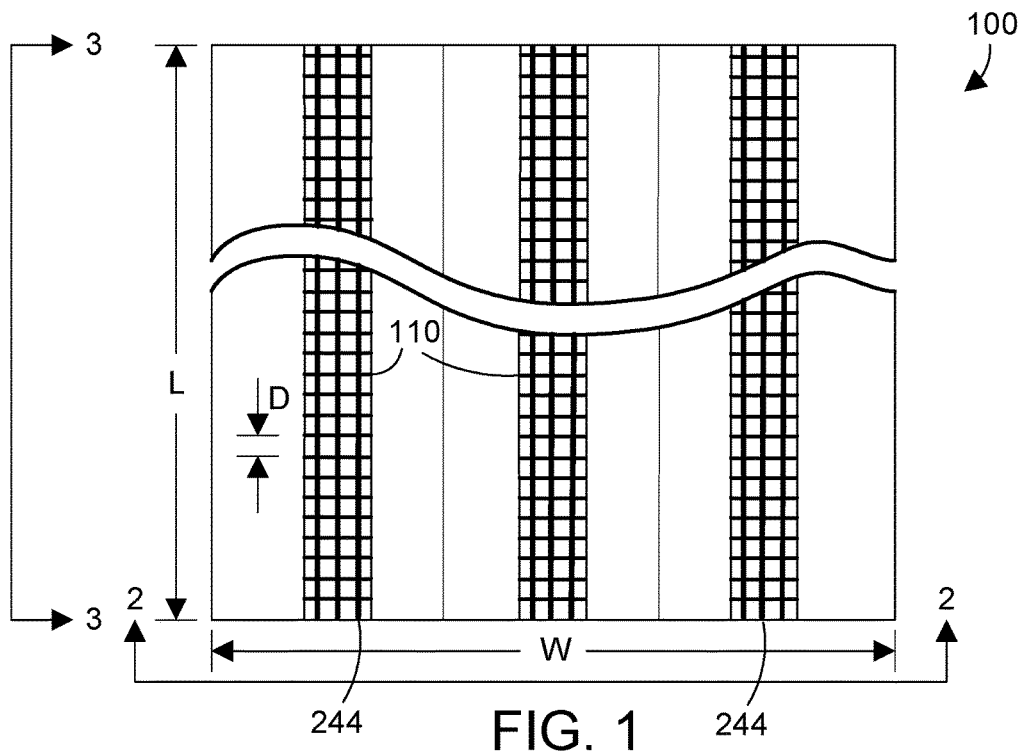
FIG. 1 is a top view of a first configuration for an extruded sticker.
Figure 2:
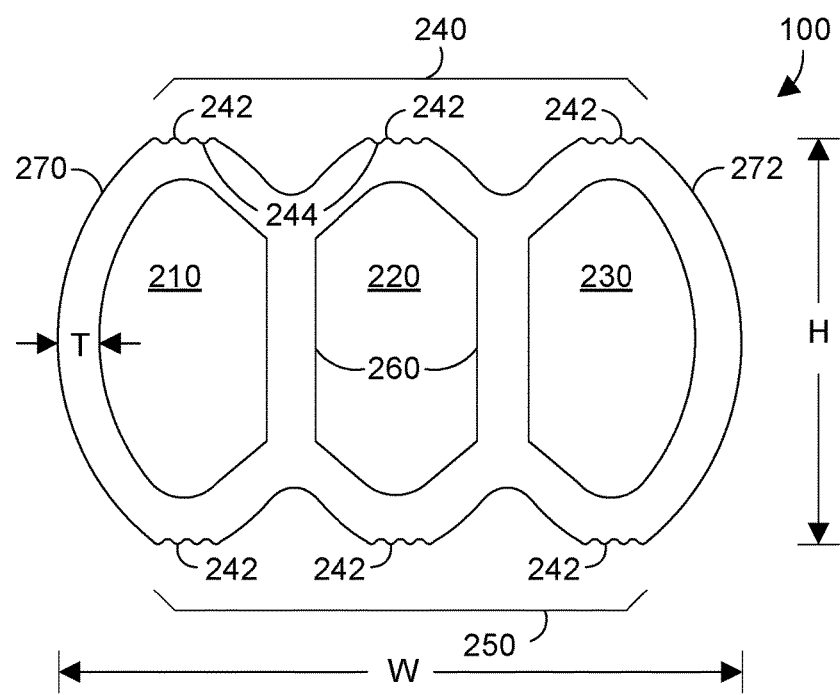
FIG. 2 is as end view of the sticker in FIG. 1 taken along the line 2-2.
Figure 3:
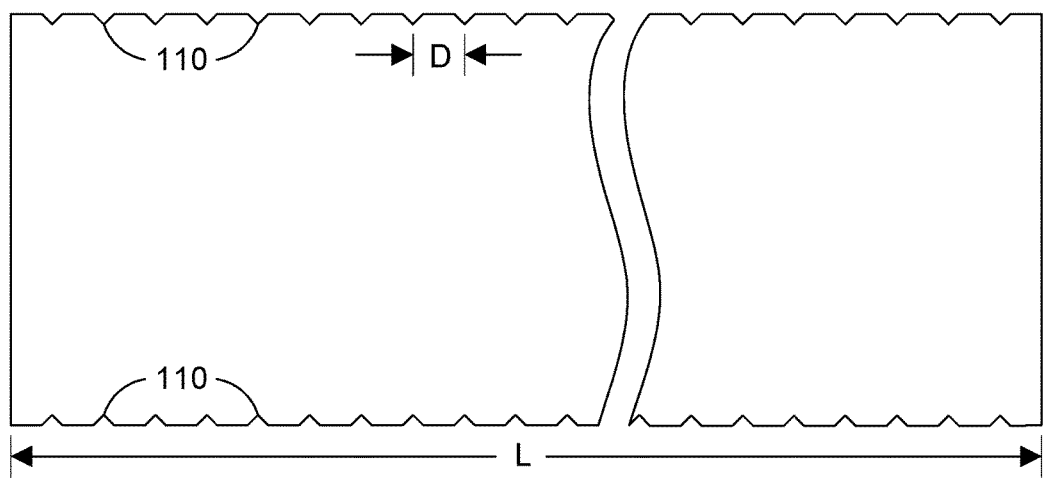
FIG. 3 is a side view of the sticker in FIG. 1 taken along the line 3-3.

Referring to FIGS. 1-3, a first suitable configuration of a sticker 100 in accordance with the disclosure and claims herein is shown. Sticker 100 has an end view as shown in FIG. 2, a top view as shown in FIG. 1, and a side view as shown in FIG. 3. Note the end view shown in FIG. 2 is the same as the cross-sectional view because the sticker is extruded through a die and subsequent sizers to achieve the final profile shown in FIG. 2. The sticker has a height H, a width W, and a length L. In one suitable implementation, the height H is 0.75 inch (1.9 cm), the width W is 1.25 inch (3.18 cm), and the length L can be any suitable length, such as 4 ft (1.2 m), 6 ft (1.8 m) and 8 ft (2.4 m). Of course, the sticker 100 can be made to any suitable dimensions and lengths depending on the specific application.

Figure 6:
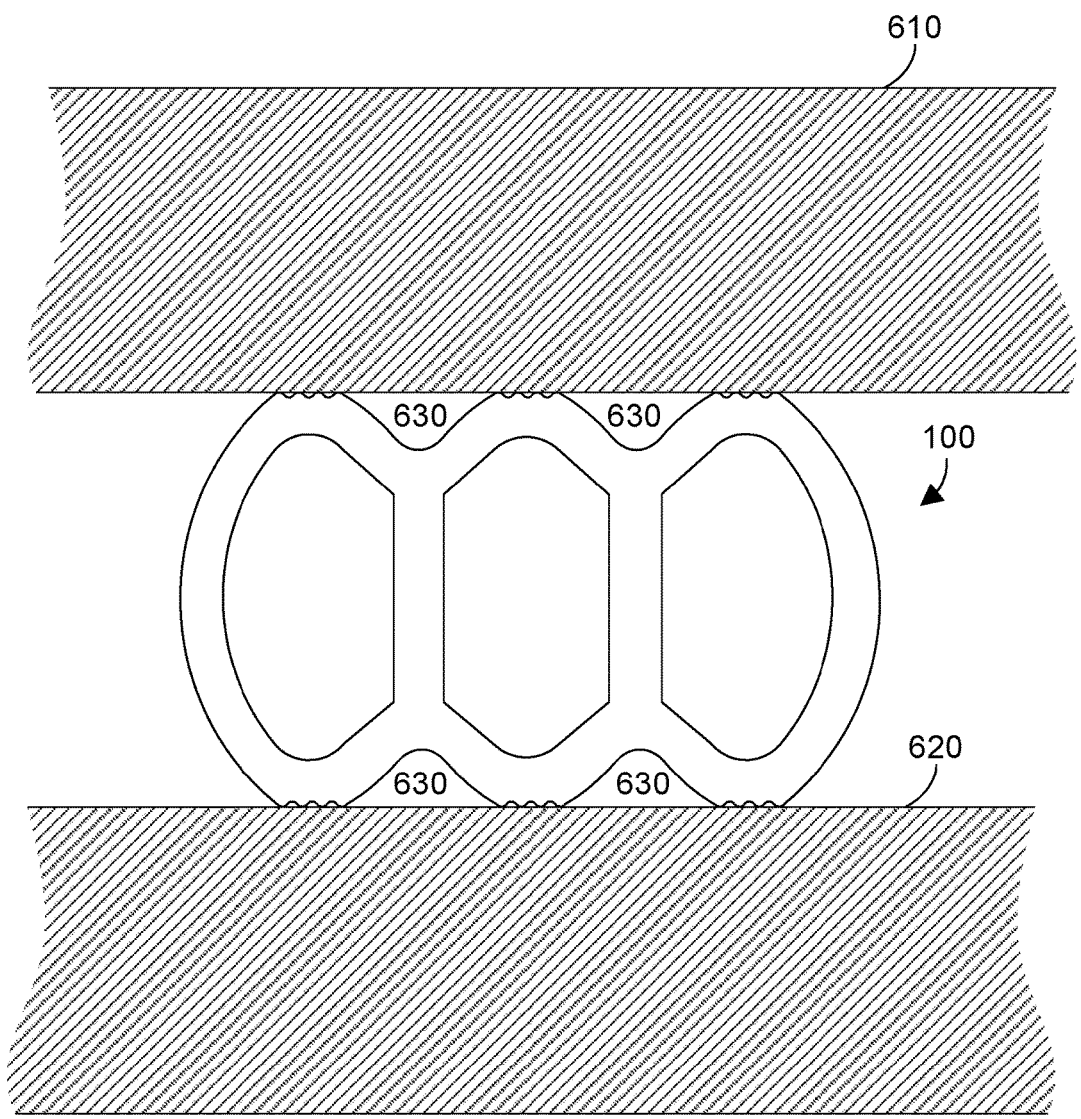
FIG. 6 is an end view of the sticker shown in FIGS. 1-3 between two boards.

As shown in FIG. 2, sticker 100 includes a plurality of longitudinal ridges 242 along its top surface 240 and along its bottom surface 250. The longitudinal ridges 242 on the top surface 240 create contact points for the wood that have an area that is substantially less than the total area of the top surface. In similar fashion, the longitudinal ridges 242 on the bottom surface 250 create contact points for the wood that have an area that is substantially less than the total area of the bottom surface. The areas between the longitudinal ridges 242 define longitudinal grooves 244 that do not contact the wood and that provide space where air can flow between the sticker 100 and the wood, as shown in FIG. 6. Minimizing the contact area of the sticker helps prevent staining of the wood as it dries. In the most preferred implementation, the area of the contact points is preferably less than 50% of the area of the top surface, the area of the contact points is more preferably less than 20% of the area of the top surface, and the area of the contact points is most preferably less than 10% of the area of the top surface.

The sticker 100 includes a plurality of substantially hollow longitudinal internal chambers, shown in FIG. 2 at 210, 220 and 230. The chambers 210, 220 and 230 are separated by reinforcing members 260, which give the sticker 100 additional strength for the compressive loads of a stack of lumber.

The top surface 240 and bottom surface 250 preferably, but not necessarily, include a plurality of lateral grooves 110 running substantially perpendicular to the longitudinal ridges 242 and grooves 244 shown in FIG. 2 to provide a knurled top surface, as shown in FIG. 1. The combination of the lateral grooves 110 and the longitudinal grooves 244 in FIG. 2 create a knurled surface that includes plurality of bumps in rows along a length of the top surface, as shown in FIG. 1. The cross-hatched lines in FIG. 1 represent the lateral grooves 110 intersecting the longitudinal grooves 244. Each white space between the lines in the cross-hatched area in FIG. 1 thus represents a raised portion, or bump, that is part of a longitudinal ridge 242. The side view in FIG. 3 shows the plurality of lateral grooves 110 on the top portion and the bottom portion of the sticker 100. The lateral grooves 110 on the top surface and bottom surface are space a distance D apart, as shown in FIGS. 1 and 3. The number of lateral grooves and the spacing between lateral grooves may vary within the scope of the disclosure and claims herein. The most preferred implementation is a cross-hatched design as shown in FIG. 1, where the lateral grooves 110 are spaced a larger distance apart than the longitudinal grooves 242. However, the lateral grooves 110 could have the same spacing as the longitudinal grooves 242. The number and spacing of the longitudinal grooves 242 and lateral grooves 110 can vary. For example, the longitudinal grooves 242 could be spaced 0.010 inch (0.025 cm) apart while the lateral grooves 110 could be spaced 0.5 inch (1.3 cm) apart. Any suitable combination of spacing between longitudinal grooves and lateral grooves is within the scope of the disclosure and claims herein. Furthermore, the spacing of grooves need not necessarily be uniform. This means the lateral grooves could be closer together towards the end of a sticker 100, and could be farther apart towards the interior of the sticker.

The longitudinal grooves 244 shown in FIG. 2 have a slightly rounded bottom. The lateral grooves 110 shown in FIG. 3 have a v-shaped bottom. These two configurations are shown by way of example. The lateral grooves 110 and longitudinal grooves 244 can have any suitable geometry that provides raised portions. The longitudinal grooves 244 are defined by the extrusion die and subsequent sizers, while the lateral grooves 110 are defined by teeth on the knurling puller, as described in more detail below.

The walls of sticker 100 preferably have a thickness T shown in FIG. 2. In the most preferred implementation, the thickness T is 0.10 inch (0.25 cm). In the specific implementation shown in FIG. 2, the thickness is the same for all walls in the sticker 100. However the thickness of different parts of the sticker 100 could vary within the scope of the disclosure and claims herein.

Sticker 100 is suitable for use in stacking lumber when the stickers are placed manually by a worker. The sticker 100 includes rounded sides 270 and 272 shown in FIG. 2. The rounded sides 270 and 272 make the sticker 100 so it can only be placed in the orientation shown in FIG. 2. If a person tried to put the sticker 100 on one of its sides, the sticker 100 would fall to the orientation shown in FIG. 2. The rounded sides 270, 272 thus make the sticker self-righting so it naturally lands in the proper orientation. In the most preferred implementation, the configuration of the top surface 240 is identical to the configuration of the bottom surface 250, so it doesn't matter whether the sticker is right side up or upside down. Either way the sticker has the orientation shown in FIGS. 2 and 6. However, the top and bottom surfaces 240 and 250 could have different configurations as well.

Figure 4:
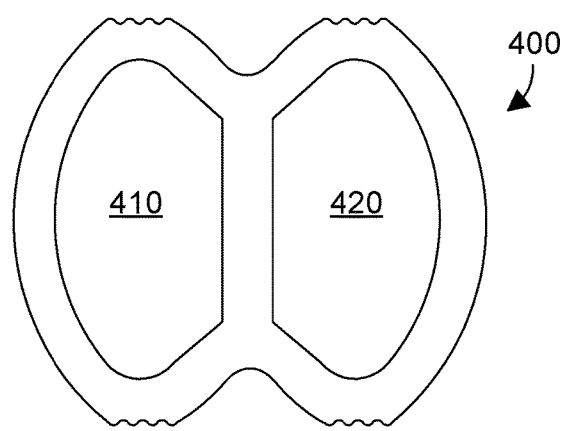
FIG. 4 is an end view of a second configuration for the extruded sticker.
Figure 5:
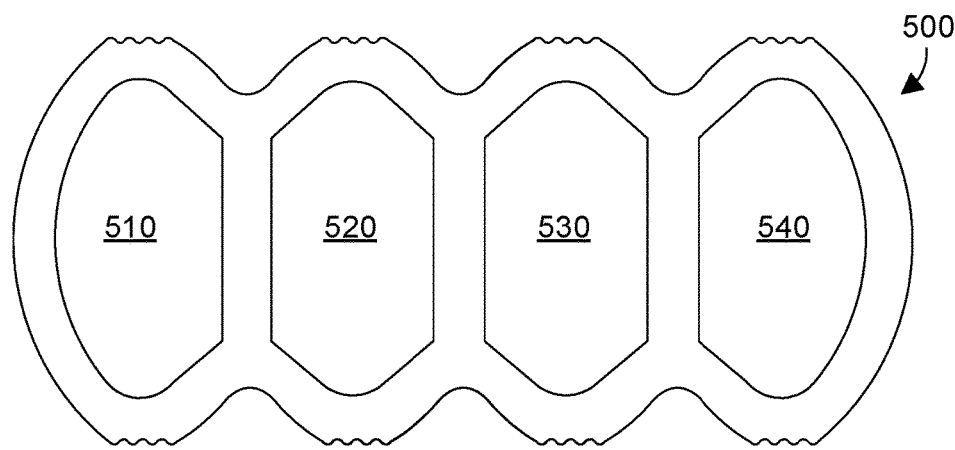
FIG. 5 is an end view of a third configuration for the extruded sticker.

The configuration shown in FIGS. 1 and 2 includes three different rows of contact points on raised portions above and below each of the substantially hollow longitudinal internal chambers 210, 220 and 230. FIGS. 4 and 5 show two alternative configurations for the sticker 100 shown in FIG. 1. FIG. 4 shows a sticker 400 that includes two substantially hollow longitudinal internal chambers 410 and 420, and provides two different rows of contact points above and below each of the chambers. FIG. 5 shows a sticker 500 that includes four substantially hollow longitudinal internal chambers 510, 520, 530 and 540, and provides four different rows of contact points on raised portions above and below each of the chambers. Of course, a sticker could be made with more than four chambers within the scope of the disclosure and claims herein.

FIG. 6 shows the sticker 100 in FIGS. 1 and 2 between two boards 610 and 620. Note the longitudinal grooves 244 identified in FIG. 2 provide passages for air to flow during the drying of the wood. In addition, there are valleys 630 shown in FIG. 6 between the raised portions with the longitudinal ridges that allow more airflow. In the most preferred implementation, the contact points on the top surface 240 that contact the lumber have an area substantially less than the total area of the top surface 240. Similarly, the contact points on the bottom surface 250 that contact the lumber have an area substantially less than the total area of the bottom surface 250. Of course, the percentage of the top and bottom surfaces that contact the wood may vary within the scope of the disclosure and claims herein.

Figure 7:
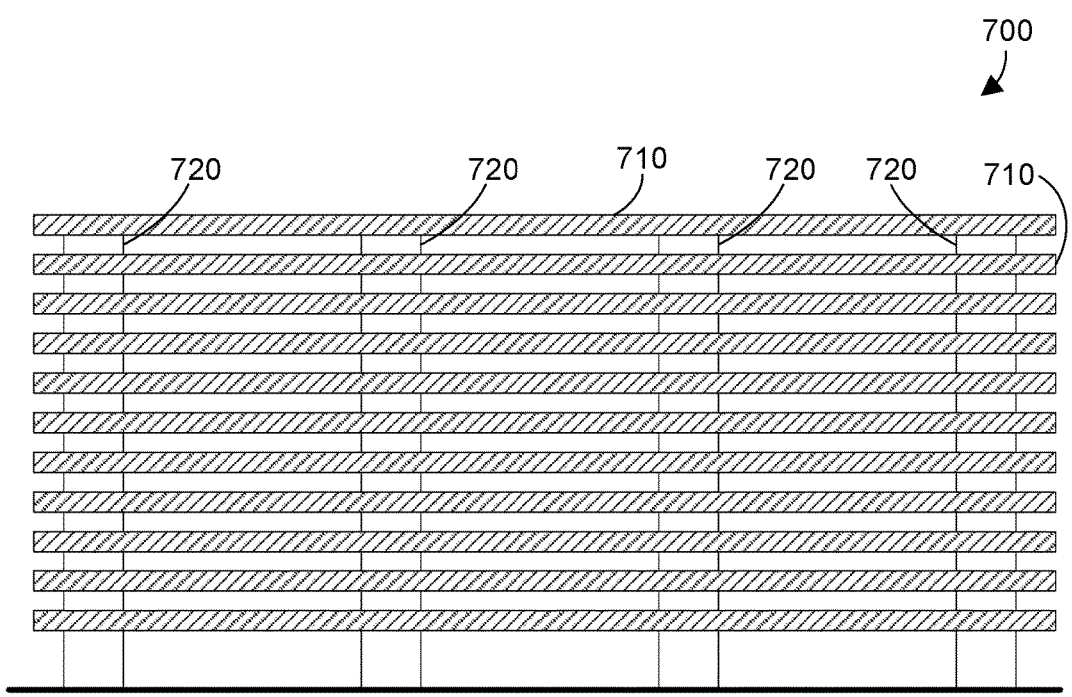
FIG. 7 is a side view of a stack of lumber that uses the stickers disclosed herein between different layers of wood.

FIG. 7 shows a side view of a stack of lumber 700 that includes multiple boards 710 separated by multiple stickers 720. Note the stickers 720 shown in FIG. 7 are shown as rectangles, but it is understood the stickers 720 in FIG. 7 could have any suitable configuration, including the configurations expressly disclosed herein and any other configuration within the scope of the disclosure and claims.

U.S. Pat. No. 4,788,777 (the "777 patent") discloses an extruded rectangular sticker made of a mixture of polycarbonate resin, polysulfone resin and glass fiber. There are three primary problems with the configurations of stickers shown in the '777 patent. First, the end views in FIGS. 2-4 show configurations that have almost as much material as hollow chambers in FIGS. 2 and 3 and one configuration that has more material than hollow chambers in FIG. 4. This results in a sticker that is substantially more costly and heavier than it needs to be. Second, the stickers shown in the '777 patent have a smooth top and bottom surface. With a sticker that has smooth top and bottom surfaces as shown in the '777 patent, the wood stacked on the stickers will not be able to grip the stickers. This is a problem because stacks of wood are typically moved into a kiln and removed from a kiln using forklifts. With the smooth stickers in the '777 patent, a stack of lumber would have the tendency to slide off the stickers because they are smooth. Third, the smooth top and bottom surfaces of the sticker in the '777 patent do not allow airflow between the sticker and the wood, which can result in staining of the wood where the stickers are and less than uniform drying of the wood.

The three problems with the sticker disclosed in the '777 patent are all eliminated in the sticker disclosed and claimed herein. The configurations shown herein have solid portions that have an area that is substantially less than the area of the hollow portions, making the stickers disclosed herein more lightweight, and therefore easier to handle and more economical. The area of the solid portions is preferably less than 50% of the total cross-sectional area, is more preferably less than 40% of the total cross-sectional area, and is most preferably less than 30% of the total cross-sectional area. The longitudinal grooves and lateral grooves provide contact points that grip the wood surface, thereby eliminating the problem of the wood sliding on the sticker when a stack of wood is moved by a forklift. The longitudinal grooves and lateral grooves, along with the spaces between the sets of longitudinal grooves and lateral grooves, such as 630 shown in FIG. 3, create places for air to flow while the wood is drying, thereby minimizing the likelihood of the sticker staining the wood.

Figure 8:
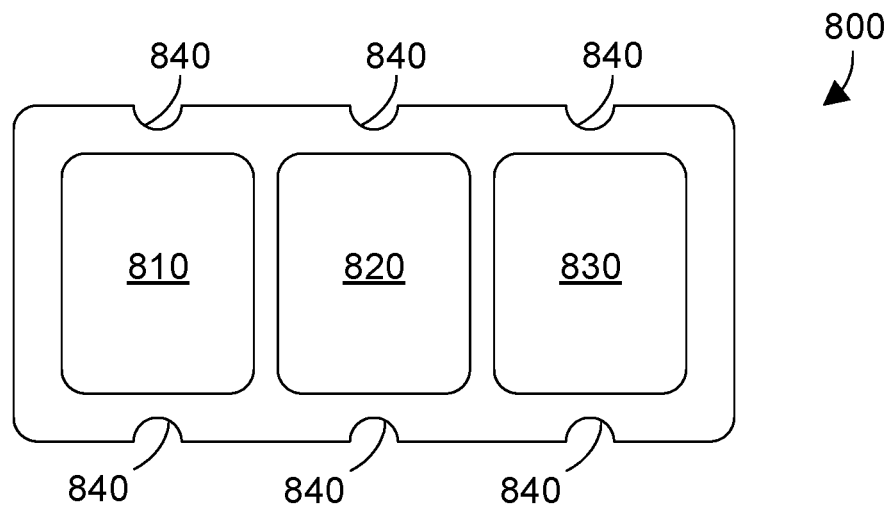
FIG. 8 is an end view of a fourth configuration for the extruded sticker.
Figure 9:
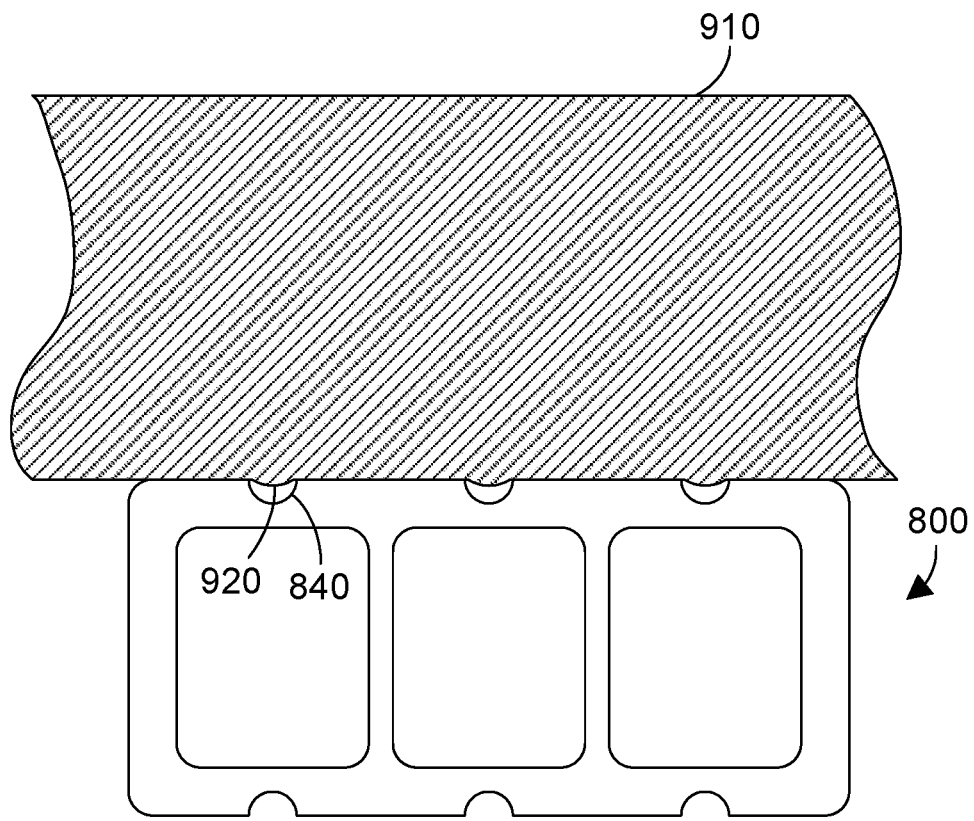
FIG. 9 is an end view of the extruded sticker shown in FIG. 8 showing how soft wood presses into the grooves to provide grip.

Various alternative configurations for the sticker are disclosed herein. Referring to FIG. 8, a sticker 800 has substantially flat and parallel top and bottom surfaces, and substantially parallel side surfaces that are perpendicular to the top and bottom surfaces. The sticker 800 defines three substantially hollow longitudinal internal chambers 810, 820 and 830. The sticker 800 includes multiple longitudinal grooves 840 on the top and bottom surfaces. When drying softwood, the staining is not as big a concern due to the higher temperatures and shorter drying cycle times when compared to drying hardwoods. Thus, the surface area that touches the wood on the top surface and bottom surface can be much larger, as shown in the example in FIG. 8. The longitudinal grooves 840 provide grip to the wood, as shown in FIG. 9. A piece of softwood 910 is placed on the sticker 800. Because the softwood 910 is soft, the wood deforms slightly into the longitudinal grooves 840, as shown by the slight deformation 920 in FIG. 9. These deformations provide grip between the wood and the sticker 800, which prevents a stack of lumber from slipping off its stickers when moved using a forklift.

In the softwood industry, most of the stacking of lumber on stickers is done by stacking machines that alternatively place the stickers, then stack a layer of wood, then place the next layer of stickers, followed by the next layer of wood, and so on. Many of the existing stacking machines in the softwood industry expect a rectangular sticker. For these machines, the configuration shown in FIGS. 1 and 2 that has curved sides may not work well. The sticker 800 in FIGS. 8 and 9 has a substantially rectangular shape that allows it to be used with the automated machines that stack lumber.

Figure 10:
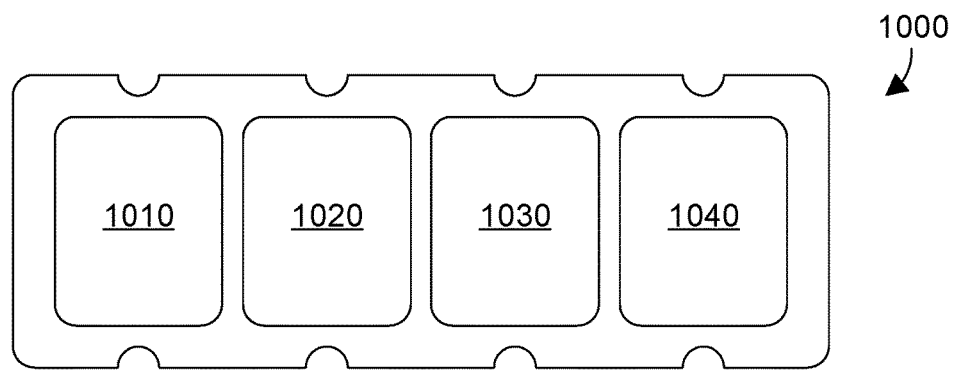
FIG. 10 is an end view of a fifth configuration for the extruded sticker.
Figure 11:
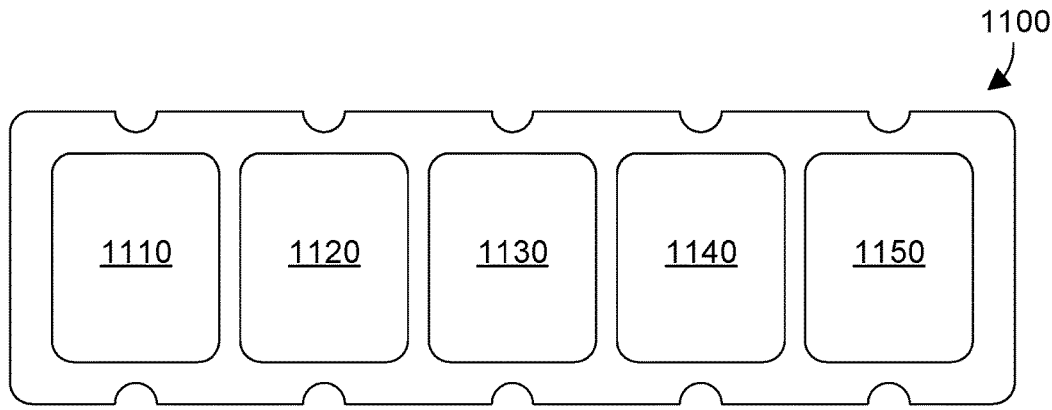
FIG. 11 is an end view of a sixth configuration for the extruded sticker.

Two alternative configurations for the sticker 800 shown in FIGS. 8 and 9 are shown in FIGS. 10 and 11. Sticker 1000 in FIG. 10 includes four hollow chambers 1010, 1020, 1030 and 1040. Sticker 1100 in FIG. 11 includes five hollow chambers 1110, 1120, 1130, 1140 and 1150. Of course, a sticker within the scope of the disclosure and claims herein may include any suitable number of hollow chambers in any suitable configuration.

Figure 12:
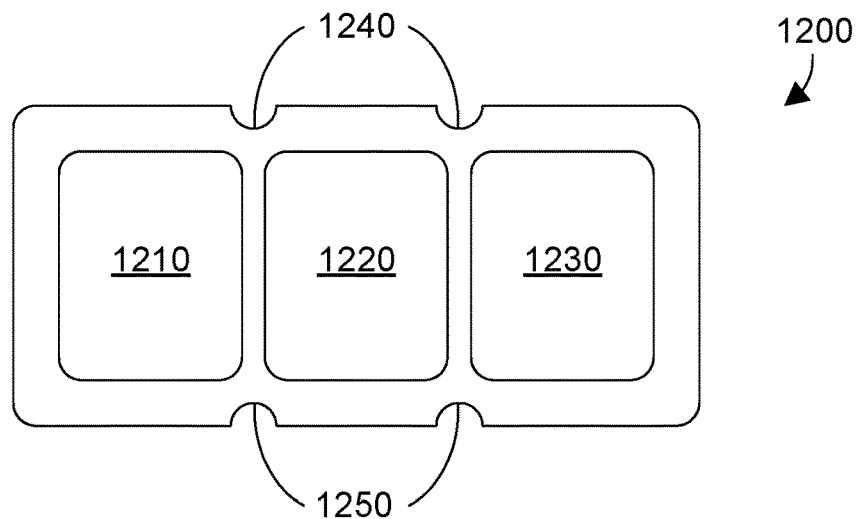
FIG. 12 is an end view of a seventh configuration for the extruded sticker.

FIGS. 12-21 each disclose different configurations for a sticker that is within the scope of the disclosure herein. FIG. 12 shows a sticker 1200 that is similar to sticker 800 shown in FIGS. 8 and 9 that has three hollow chambers 1210, 1220 and 1230. The difference between the sticker 1200 and the sticker 800 in FIGS. 8 and 9 is the number and location of the longitudinal grooves 1240. Sticker 1200 includes two longitudinal grooves 1240 on its top surface and two longitudinal grooves 1250 on its bottom surface, as shown in FIG. 12.

Figure 13:
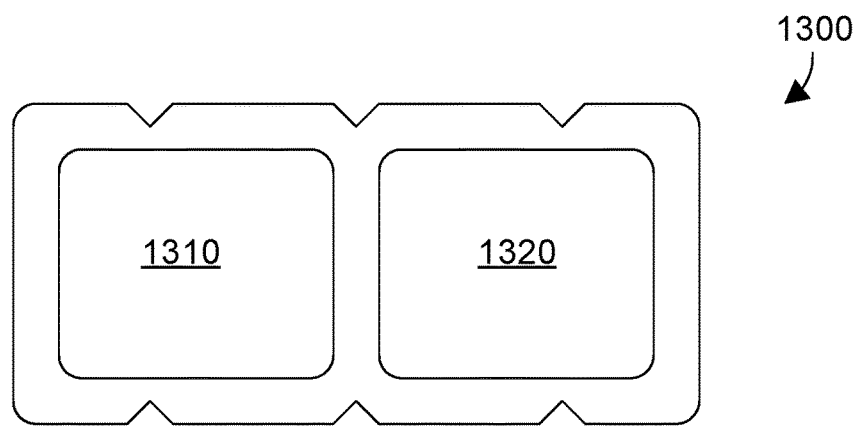
FIG. 13 is an end view of an eighth configuration for the extruded sticker.
Figure 14:
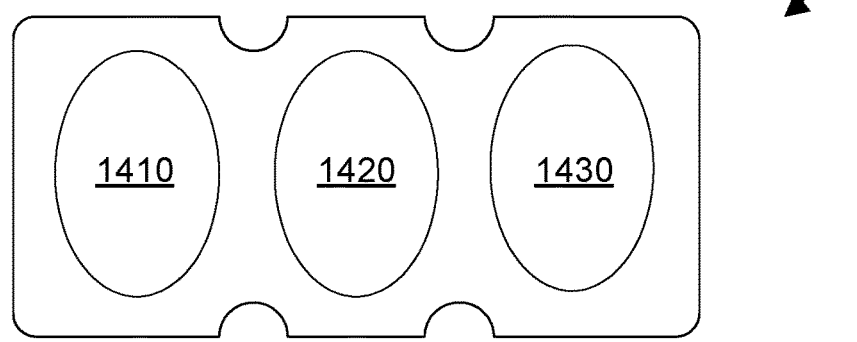
FIG. 14 is an end view of a ninth configuration for the extruded sticker.
Figure 15:
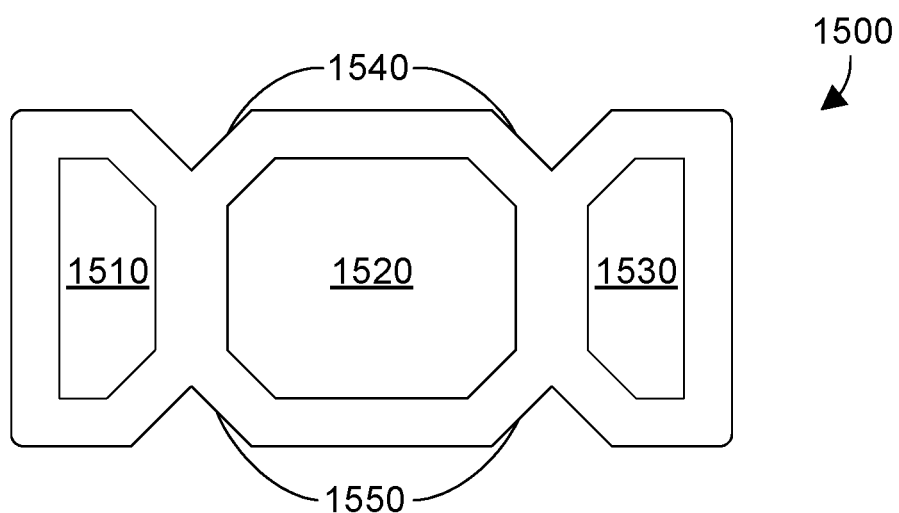
FIG. 15 is an end view of a tenth configuration for the extruded sticker.
Figure 16:
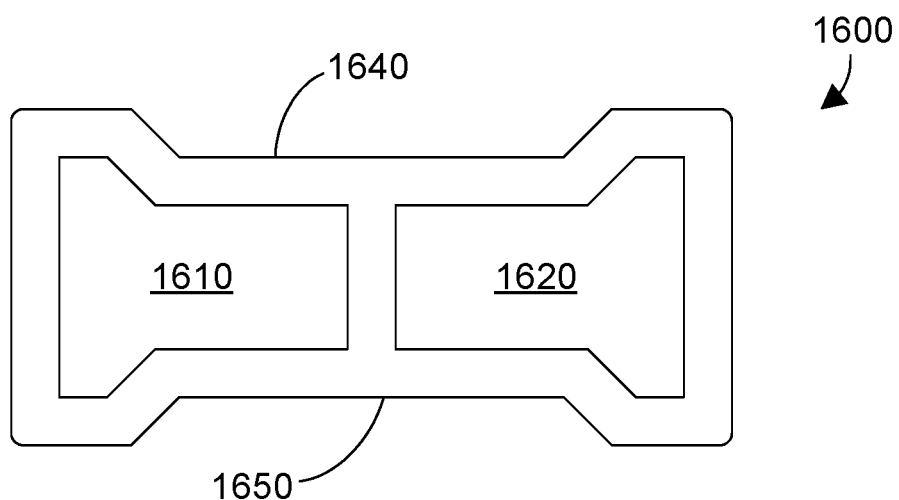
FIG. 16 is an end view of an eleventh configuration for the extruded sticker.
Figure 17:
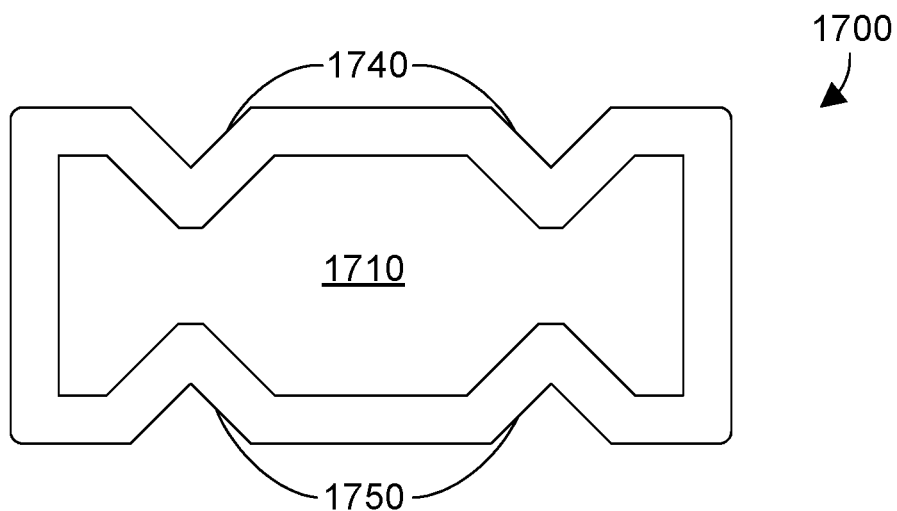
FIG. 17 is an end view of a twelfth configuration for the extruded sticker.
Figure 18:
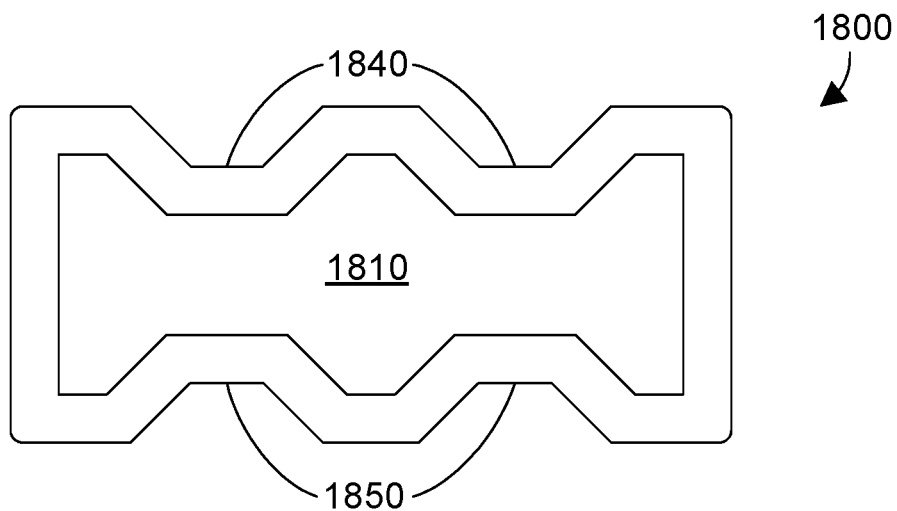
FIG. 18 is an end view of a thirteenth configuration for the extruded sticker.

FIG. 13 shows a sticker 1300 that includes two hollow chambers 1310 and 1320 and three sets of v-shaped longitudinal grooves in the top and bottom surfaces. FIG. 14 shows a sticker 1400 that includes three oval-shaped hollow chambers 1410, 1420 and 1430, and that includes two sets of rounded longitudinal grooves in the top and bottom surfaces. FIG. 15 shows a sticker 1500 that includes polygon hollow chambers 1510, 1520 and 1530, and that includes two sets of v-shaped grooves 1540 and 1550 in the top and bottom surfaces, respectively. FIG. 16 shows a sticker 1600 that includes two polygon hollow chambers 1610 and 1620, with one large groove 1640 on the top surface and one large groove 1650 on the bottom surface. FIG. 17 shows a sticker 1700 that includes a single polygon hollow chamber 1710 and one pair of v-shaped grooves 1740 on the top surface and a second pair of v-shaped grooves 1750 on the bottom surface. FIG. 18 shows a sticker 1800 with a single polygon hollow chamber 1810 and with a top surface that includes two larger grooves with flat bottoms 1840 and with a bottom surface that includes two similar larger grooves with flat bottoms 1850.

Figure 19:
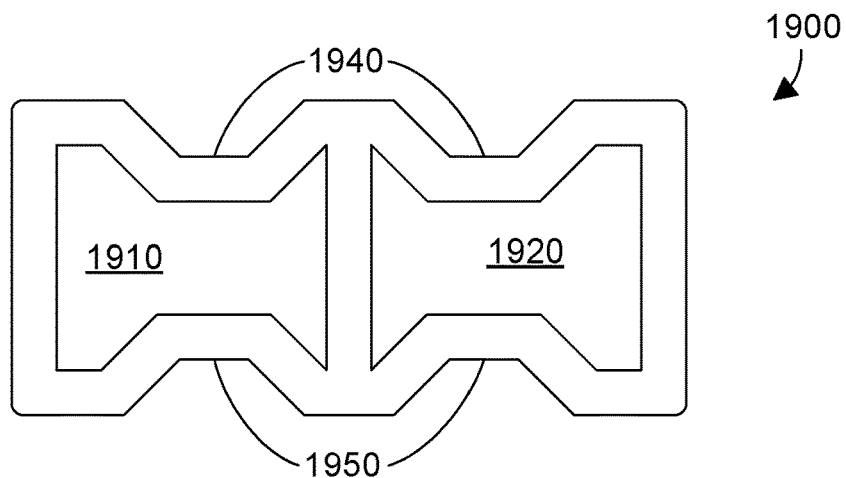
FIG. 19 is an end view of a fourteenth configuration for the extruded sticker.
Figure 20:
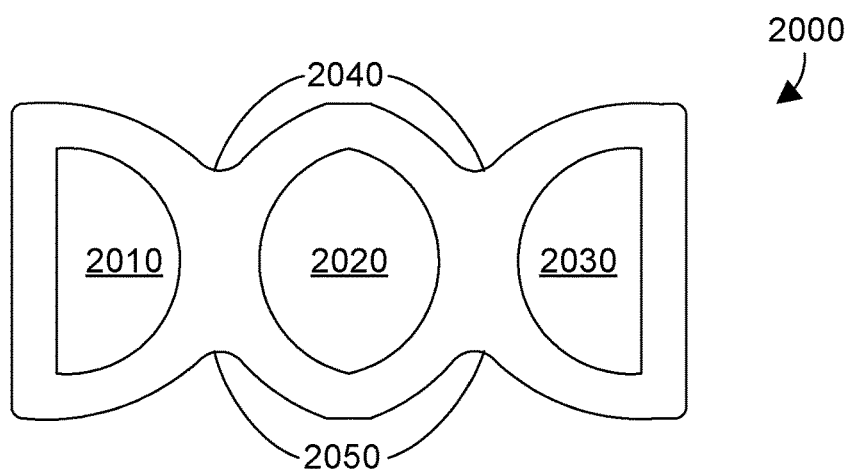
FIG. 20 is an end view of a fifteenth configuration for the extruded sticker.

FIG. 19 shows a sticker 1900 with two polygon hollow chambers 1910 and 1920, and with a top surface that includes two larger grooves with flat bottoms 1940 and with a bottom surface that includes two similar larger grooves with flat bottoms 1950. FIG. 20 shows a sticker 2000 with two hemi-cylindrical hollow chambers 2010 and 2030 and a hollow chamber 2020 with curved walls as shown. The top surface includes two longitudinal grooves 2040 and the bottom surface includes two similar longitudinal grooves 2050.

Figure 21:
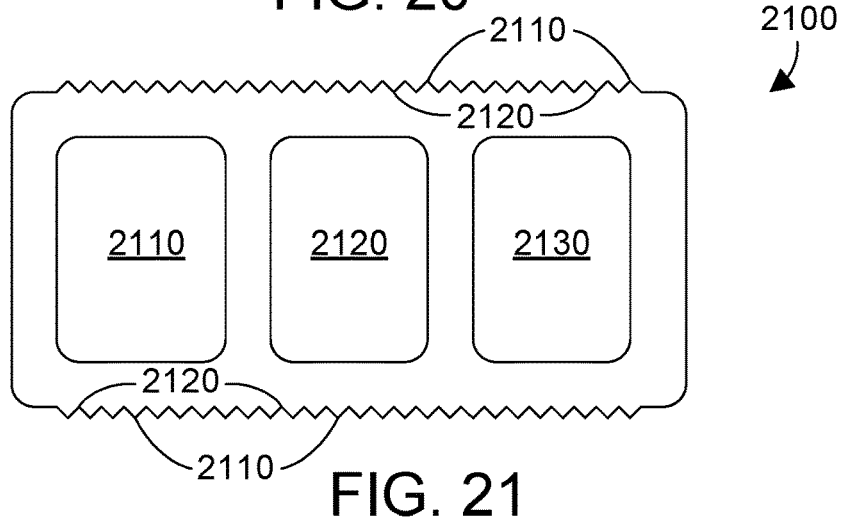
FIG. 21 is an end view of a sixteenth configuration for the extruded sticker.

FIG. 21 shows a sticker 2100 with three rectangular hollow chambers 2110, 2120 and 2130, and with top and bottom surfaces that each includes multiple longitudinal ridges 2110 and corresponding multiple longitudinal grooves 2120. Sticker 2100 is especially well-suited for use with softwoods because of the substantially rectangular shape that allows sticker 2100 to be used with automated stacking machines.

The various different configurations are shown in the drawings herein to illustrate some of the variations that are within the scope of the disclosure and claims herein. There can be any suitable number of substantially hollow internal longitudinal chambers, with any suitable geometry. There can be any suitable number of longitudinal ridges, with any suitable geometry. There can be any suitable number of longitudinal grooves, with any suitable geometry. Any of the top surfaces that contact the wood may have relatively small longitudinal grooves, similar to those 244 shown in FIG. 2. In addition, any or all of the configurations shown herein may include lateral grooves that intersect the longitudinal grooves to provide contact points that reduce the area of contact between the sticker and the wood. The disclosure and claims herein expressly extend to all variations shown and other variations not shown that lie within the scope of the disclosure and claims.

Figure 22:
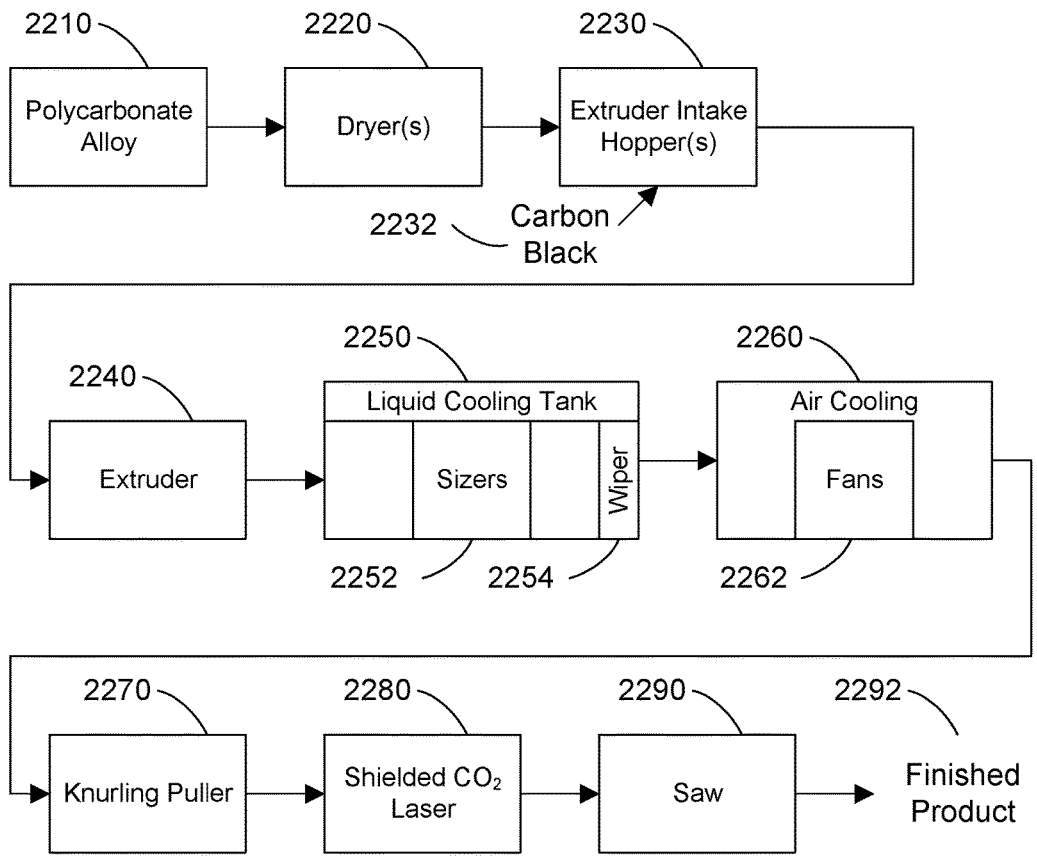
FIG. 22 is a block diagram showing a production process for the extruded sticker.

FIG. 22 represents a manufacturing process for manufacturing a sticker. The process starts with raw material in the form of a polycarbonate alloy 2210. The polycarbonate alloy can include various components to achieve desired performance specifications for the finished product, such as those shown in FIG. 25. Polycarbonate resin is the ingredient having the largest proportion in the alloy. Virgin or reground (recycled) polycarbonate resin may be used. Polysulfone resin is preferably included in the alloy 2210. The amount of polysulfone resin is preferably at least 10% by weight, and is more preferably from 10-20% by weight of the alloy 2210. Glass fibers may optionally be included in the polycarbonate alloy 2210. When glass fibers are included, the glass fibers preferably comprise 5-30% by weight of the alloy 2210, and more preferably comprise 10-20% by weight of the alloy 2210. The polycarbonate alloy may include any other suitable additives or ingredients, such as glass micro-spheres, acrylonitrile butadiene styrene (ABS), polyethylene terephthalate (PET), carbon black for ultraviolet (UV) protection, polyphthalamide (PPA), carbon fibers, etc.

When the polycarbonate alloy 2210 is ordered from a composites manufacturer, the manufacturer has some leeway in determining what ingredients go in. As a result, specific ingredients in precise amounts are not typically specified. Instead, ranges of ingredients are provided, along with specifications the final product must meet. FIG. 25 shows a table of extrusion specifications. Some of the specifications in the table in FIG. 25 can be tested according to standards by the American Society for Testing and Materials (ASTM), and the corresponding ASTM standard for each test is shown. The tensile break strength is preferably greater than 9,000 pounds per square inch (PSI), which is equivalent to 62.1 megapascal (MPa) in metric units, which can be tested according to ASTM D638. The elongation at break is preferably 110-130%, which can be tested according to ASTM D638. The flexural strength is preferably greater than 13,500 PSI, which is equivalent to 93.0 MPa, which can be tested according to ASTM D790. The flexural modulus is preferably greater than 350,000 PSI per minute, which is equivalent to 2.41 gigapascal (GPa) per minute, which can be tested according to ASTM D790. The modulus of elasticity is preferably greater than 350,000 PSI, which is equivalent to 2.41 GPa, which can be tested according to ASTM D790. The compressive strength is preferably greater than 12,500 PSI, which is equivalent to 86.2 MPa, which can be tested according to ASTM D695. The Izod impact strength is preferably 12-16 ft-lb per inch, which is equivalent to 640-850 Joules/meter (J/m), which can be tested according to ASTM D256. The melt flow index is preferably 3 to 6, which corresponds to Code 2 polycarbonate material. Only Code 1 polycarbonate material is of a higher grade, with many polycarbonate materials being of lower grades. The specific gravity is preferably 1.22 to 1.3. The provider of the polycarbonate alloy 2210 has some freedom to determine what grade of polycarbonate to use and in what proportions, as long as the specifications, such as those shown in FIG. 25, are met. In a preferred implementation, samples are taken from each extrusion batch and sent to an independent laboratory to verify the samples satisfy the applicable specifications to assure the quality of stickers produced from each extrusion batch.

Referring again to FIG. 22, the polycarbonate alloy 2210 is introduced into one or more dryers 2220. This can be done, for example, by suction from a bulk container of polycarbonate alloy 2210 through one or more screens into one or more cyclone dryers. The dryers 2220 use heaters to blow the polycarbonate alloy 2210 around until the polycarbonate alloy 2210 has a low enough moisture content. In the preferred implementation, the moisture content is most preferably less than 0.02%. Using a series of one to three dryers, it typically takes two to four hours to get the polycarbonate alloy sufficiently dry. Once the polycarbonate alloy is sufficiently dry, it is introduced into one or more intake hoppers 2230 on the extruder. At this point carbon black colorant 2232 is injected. Adding carbon black 2232 gives the sticker two important characteristics. First, the carbon black 2232 makes the sticker a black color. Second, the carbon black 2232 provides protection from ultraviolet (UV) rays. Thus, adding carbon black 2232 helps reduce degradation of the sticker due to exposure to UV rays from the sun or other sources. The amount of carbon black needed depends on the color of the polycarbonate alloy. For very light colors, like white, more carbon black is needed. For more neutral colors, like light blue or clear, less carbon black is needed. The carbon black 2232 is preferably 0.5 to 2 percent by weight, and is most preferably 1 to 2 percent by weight. While the carbon black 2232 is shown in FIG. 22 being injected into the extruder intake hopper(s) 2230, the carbon black 2232 could be provided instead as a component in the polycarbonate alloy 2210.

The extruder 2240 extrudes the polycarbonate alloy with the carbon black through one or more dies. Extruder 2240 is preferably a non-vented single-screw pull-type extruder with three-zone heaters. The screw in the extruder preferably has a length to diameter ratio of 21-26 and is polished. The compression ratio provided by the screw is preferably 1:2.5-3.2. The extrusion passes from the extruder die(s) into a liquid cooling tank 2250 that provides a quenching bath and includes a series of sizers 2252 that successively make the extrusion closer and closer to the desired final dimensions, with the last sizer finalizing the extrusion to the desired final dimensions. Water is the preferred liquid in the liquid cooling tank, but other liquids could also be used. In the most preferred implementation, the water has a controlled temperature of 140 degrees Fahrenheit (60 degrees Celsius). The extrusion passes from the liquid cooling tank 2250 through a wiping gasket 2254 that wipes the liquid off the extrusion and keeps the liquid in the liquid cooling tank 2250. The extrusion passes into an air cooling area 2260 where multiple fans 2262 blow air on the extrusion to continue cooling it.

Figure 23:
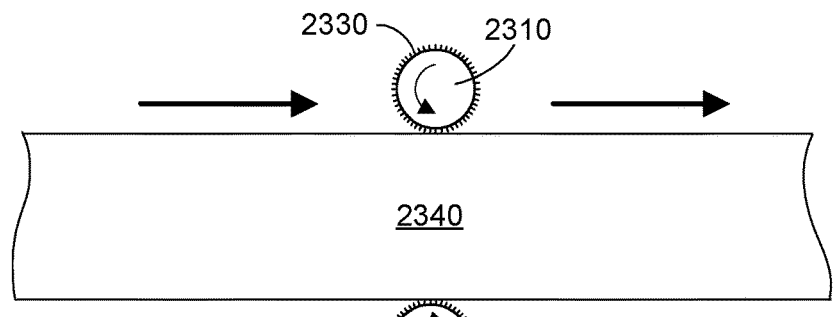
FIG. 23 is a side view of the knurling puller shown in FIG. 22 showing how the knurling puller adds lateral grooves to the top and bottom surfaces of the extruded sticker.

The extrusion then passes through a knurling puller 2270. Pull-type extruders all have a puller of some sort. But the knurling puller 2270 is unique because it includes teeth on the pulling rollers that provide the lateral grooves that are preferably perpendicular to the longitudinal ridges on the top and bottom surfaces. This is shown in more detail in FIG. 23, where two rollers 2310 and 2320 are shown that are part of the knurling puller 2270. When the rollers 2310 and 2320 rotate in the directions shown in FIG. 23, the extrusion 2340 is pulled in the direction shown by the arrow in FIG. 23, and the teeth 2330 on the rollers 2310 and 2320 provide the lateral grooves in the top and bottom surfaces of the extrusion 2340 at a distance apart D shown in FIGS. 1 and 3. The knurling puller 2270 preferably includes a variable speed drive motor with a speed adjustment such as a rheostat that controls the speed of the two rollers 2310 and 2320, which determines the speed of the extrusion process. The configuration shown in FIG. 1 shows a cross-hatched pattern on the top surface, which means the rollers 2310 and 2320 have teeth that are perpendicular to the longitudinal axis of the extrusion. However, other configurations could also be used. For example, the teeth on the rollers 2310 and 2320 could be in a spiral such that they create lateral grooves at a 45 degree angle with respect to the longitudinal axis of the extrusion. Note also the geometry of the teeth on the rollers 2310 and 2320 can vary to provide rounded grooves, v-shaped grooves, or grooves having any other suitable geometry.

Because the knurling puller 2270 governs the speed of the extrusion process, when an extrusion process is first started there is typically some length of extrusion on the front end that must be discarded until the process is normalized and the extrusion has the desired size and shape. This discarded material can be reground and used as part of the polycarbonate alloy for another run.

The extrusion next passes under a shielded $CO_2$ laser 2280, which can engrave any suitable information on the extrusion. Examples of suitable information include a part number, a lot number, a product name and/or logo, a customer name and/or logo, etc. This information can be repeated at suitable intervals along the extrusion, such as every 18 inches (46 cm), or at other suitable intervals. The extrusion then passes to an automated saw 2290 that cuts the extrusion to one or more desired lengths to provide the finished product 2292. In the most preferred implementation, the saw cuts the extrusion in lots of the same length so the finished product can be packaged and handled more easily than if the lots included extrusions in different lengths.

Figure 24:
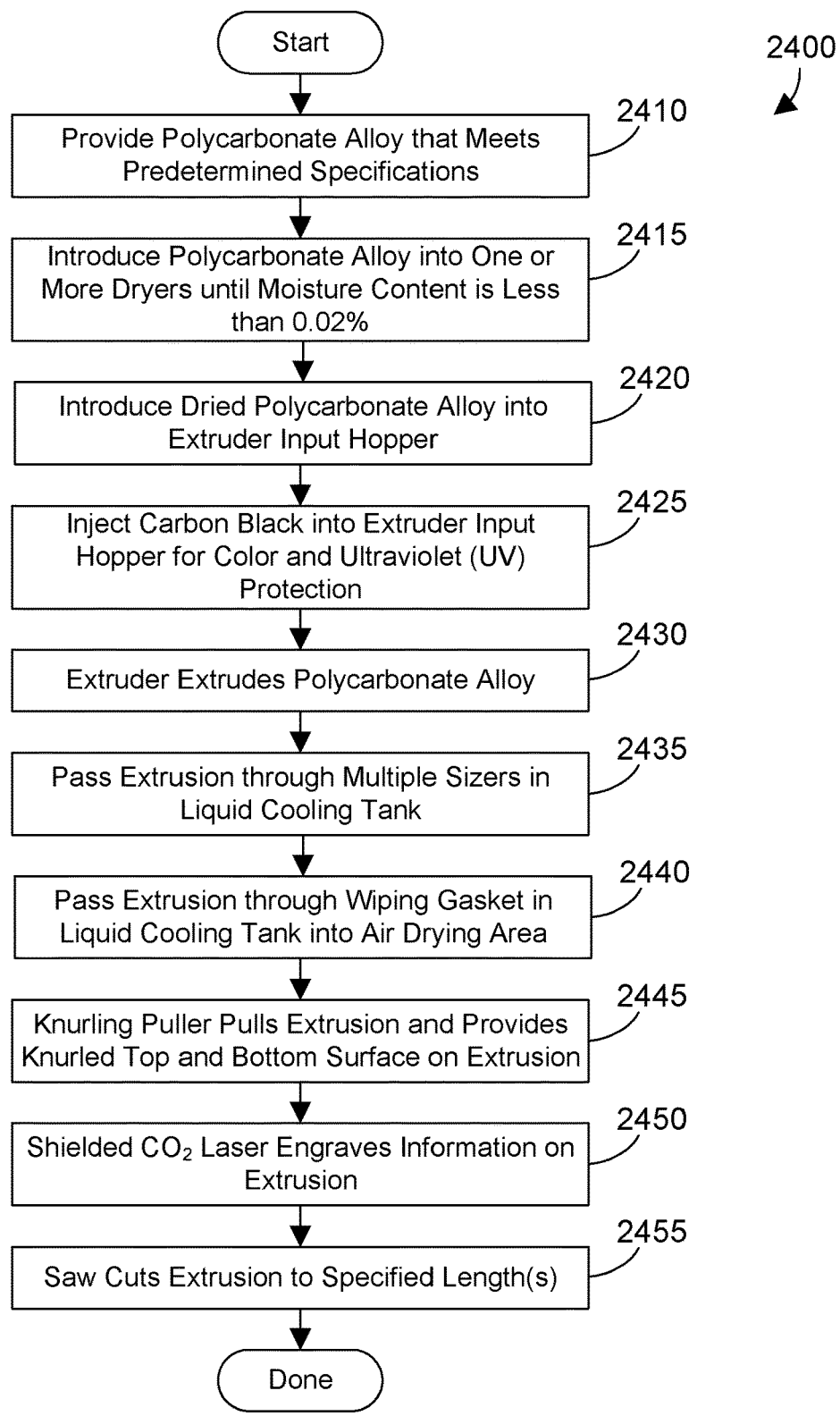
FIG. 24 is a flow diagram of a method for manufacturing the extruded sticker.

Referring to FIG. 24, a method 2400 for manufacturing a sticker as disclosed herein starts by providing the polycarbonate alloy that meets predetermined specifications (step 2410). The specifications in FIG. 25 are one example of predetermined specifications that could be used for the polycarbonate alloy. The polycarbonate alloy is introduced into one or more dryers until the moisture content is less than some predetermined threshold, such as 0.02% (step 2415). The dried polycarbonate alloy is introduced into the extruder input hopper (step 2420), and carbon black is injected into the hopper for color and ultraviolet protection (step 2425). The extruder then extrudes the polycarbonate alloy (step 2430). The extrusion passes through multiple sizers in a liquid cooling tank (step 2435). The extrusion then passes through a wiping gasket in the liquid cooling tank into an air drying area (step 2440). A knurling puller then pulls the extrusion and provides a knurled top and bottom surface on the extrusion (step 2445) by creating the lateral grooves that are preferably perpendicular to the longitudinal grooves on the top and bottom surfaces. A shielded $CO_2$ laser then engraves information on the extrusion (step 2450). An automated saw then cuts the extrusion to one or more specified lengths (step 2455). Method 2400 is then done.

Polycarbonate alloy is typically purchased by the truckload of approximately 45,000 lbs (20,400 kg) packaged in Gaylord boxes or supersacks. Using the preferred dimensions for the sticker shown in FIGS. 1 and 2, a full batch of 45,000 lbs (20,400 kg) can make approximately 40,000 stickers 4 ft (1.2 m) long; 27,900 stickers that are 6 ft (1.8 m) long, or 20,400 stickers that are 8 ft (2.4 m) long.

The extruded stickers disclosed herein are very strong and durable. They must be strong to withstand the force exerted on the bottom stickers in a full stake of wood. The pressure on an extruded sticker on the bottom layer can be calculated using the formula P=F/A, where P is pressure, F is applied force, and A is area of contact. For the configuration shown in FIGS. 1 and 2, the top surface 240 includes three elevated portions that include the plurality of longitudinal ridges 242 and the plurality of longitudinal grooves 244. The bottom surface 240 includes three similar elevated portions. We assume the width of an elevated portion is 0.125 inch (0.32 cm). We assume an 8 ft (2.4 m) square stack of lumber, and the extruded sticker is thus 8 ft (2.4 m) long. The area of each elevated portion is thus 0.125 in (0.32 cm)×96 in (240 cm), or 12 square inches (77 square cm), multiplies by 3 elevated areas, for a total of 36 square inches (231 square centimeters) of contact area on the top and bottom of the extruded sticker. We assume five extruded stickers are placed along the length of a 96 inch (240 cm) board, which means the total contact area of wood on stickers is 36 square inches (231 square centimeters)×5=180 square inches (1,160 square centimeters).

Next we assume four bundles of wood each weighing 15,000 lbs (6,800 kg) are stacked one atop the other, which would make the total force on the bottom row of extruded stickers 60,000 lbs (27,200 kg). The force on the stickers can be calculated by dividing the 60,000 lbs (27,200 kg) by 180 square inches (1,160 square centimeters), which is 333 PSI (23 kg per square centimeter). Note this calculation assumes the elevated portions that are 0.125 in (0.32 cm) wide are fully in contact with the wood. Due to the longitudinal ridges 242, longitudinal grooves 244, and lateral grooves 110, the actual contact area of the extruded sticker on a board may be much less, as much as 50% less. If the actual contact area is 50% less than what was calculated above, this would double the PSI on the actual contact area to 666 PSI. However, as shown in FIG. 25, the compressive strength of the extruded sticker is more than 12,500 PSI. The extruded stickers disclosed herein are more than strong enough to support the weight of wood in multiple stacks, and are durable enough to last hundreds, or more probable, thousands of cycles.

The disclosure herein thus supports a sticker for spacing wood comprising: an extruded body made of an alloy of polycarbonate resin and polysulfone resin, the extruded body comprising: a plurality of substantially hollow longitudinal internal chambers; a top surface comprising: a first plurality of longitudinal ridges that provide a first contact area having a first area substantially smaller than a total area of the top surface; and a first plurality of longitudinal grooves between the first plurality of longitudinal ridges; a bottom surface comprising: a second plurality of longitudinal ridges that provide a second contact area having a second area substantially smaller than a total area of the bottom surface; and a second plurality of longitudinal grooves between the second plurality of longitudinal ridges.

The disclosure herein also supports a sticker for spacing wood comprising: an extruded body made of an alloy of polycarbonate resin, 10-20% polysulfone resin by weight, 1-2% carbon black by weight, and 10-20% of glass fibers by weight, the extruded body comprising: a plurality of substantially hollow longitudinal internal chambers; a top surface comprising: a first plurality of longitudinal ridges that provide a first contact area having a first area substantially smaller than a total area of the top surface; a first plurality of longitudinal grooves between the first plurality of longitudinal ridges; and a first plurality of lateral grooves running substantially perpendicular to the first plurality of longitudinal grooves to provide a knurled top surface comprising a first plurality of bumps in a first plurality of rows along a length of the top surface; a bottom surface comprising: a second plurality of longitudinal ridges that provide a second contact area having a second area substantially smaller than a total area of the bottom surface; a second plurality of longitudinal grooves between the second plurality of longitudinal ridges; and a second plurality of lateral grooves running substantially perpendicular to the second plurality of longitudinal grooves to provide a knurled bottom surface comprising a plurality of bumps in a plurality of rows along a length of the bottom surface; wherein the tensile break strength of the extruded body is at least 9,000 pounds per square inch (PSI) (62.1 megapascal (MPa)); wherein the elongation of a sample of the extruded body at break during a test of the tensile break strength is 110-130%; wherein the flexural strength of the extruded body is at least 13,500 pounds per square inch (PSI) (93.0 megapascal (MPa)); wherein the flexural modulus of the extruded body is at least 350,000 pounds per square inch (PSI) per minute (2.41 gigapascal (GPa) per minute); wherein the modulus of elasticity for the extruded body is 350,000 PSI (2.41 gigapascal (GPa)); wherein the compressive strength of the extruded body is at least 12,500 pounds per square inch (PSI) (86.2 megapascal (MPa)); wherein the Izod impact strength for the extruded body is in the range of 12-16 ft-lb per inch (640-850 Joules per meter); wherein the melt flow index for the alloy is from 3 to 6; and wherein the specific gravity for the extruded body is 1.22 to 1.3.

The disclosure herein additionally supports a method for manufacturing a sticker for spacing wood, the method comprising: providing an alloy comprising polycarbonate resin, and polysulfone resin that is at least 10% of the alloy by weight; drying the alloy until the moisture content of the alloy is less than 0.02%; injecting carbon black into the dried alloy as the dried alloy is fed into an extruder; the extruder extruding the alloy into an extrusion; passing the extrusion through multiple sizers in a liquid cooling tank; passing the extrusion through a wiping gasket in the liquid cooling tank into an air drying area; pulling the extrusion with a puller that includes a plurality of teeth that provide a first plurality of lateral grooves running substantially perpendicular to a longitudinal axis of the extrusion in a top and bottom surface of the extrusion; and cutting the extrusion to at least one specified length.

A sticker for spacing wood is extruded from an alloy that includes polycarbonate resin and polysulfone resin. The sticker can have a variety of different configurations, including a top surface that includes contact points that have an area substantially smaller than the area of the top surface, a single or multiple internal longitudinal hallow chambers separated by multiple reinforcing members, longitudinal external grooves that allow airflow, lateral external grooves that intersect the longitudinal external grooves, curved sides for a version where the stickers are placed manually, and substantially straight sides for a version where the stickers are placed by a machine. A method for manufacturing the sticker includes pulling an extrusion with a puller that includes a plurality of teeth that provide a first plurality of lateral grooves running substantially perpendicular to a longitudinal axis of the extrusion in a top and bottom surface of the extrusion.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A method for manufacturing a sticker for spacing wood, the method comprising:
   providing an alloy comprising polycarbonate resin, and polysulfone resin that is at least 10% of the alloy by weight;
   drying the alloy until the moisture content of the alloy is less than 0.02%;
   injecting carbon black into the dried alloy as the dried alloy is fed into an extruder;
   the extruder extruding the alloy into an extrusion;
   passing the extrusion through multiple sizers in a liquid cooling tank;
   passing the extrusion through a wiping gasket in the liquid cooling tank into an air drying area;
   pulling the extrusion with a puller that includes a plurality of teeth that provide a first plurality of lateral grooves running substantially perpendicular to a longitudinal axis of the extrusion in a top and bottom surface of the extrusion; and
   cutting the extrusion to at least one specified length.

2. The method of claim 1 further comprising engraving information on the extrusion using a laser.

3. The method of claim 1 wherein the tensile break strength of the extrusion is at least 9,000 pounds per square inch (PSI) (62.1 megapascal (MPa)).

4. The method of claim 3 wherein the elongation of a sample of the extrusion at break during a test of the tensile break strength is 110-130%.

5. The method of claim 1 wherein the flexural strength of the extrusion is at least 13,500 pounds per square inch (PSI) (93.0 megapascal (MPa)).

6. The method of claim 1 wherein the flexural modulus of the extrusion is at least 350,000 pounds per square inch (PSI) per minute (2.41 gigapascal (GPa) per minute).

7. The method of claim 1 wherein the modulus of elasticity of the extrusion is 350,000 PSI (2.41 gigapascal (GPa)).

8. The method of claim 1 wherein the compressive strength of the extrusion is at least 12,500 pounds per square inch (PSI) (86.2 megapascal (MPa)).

9. The method of claim 1 wherein the Izod impact strength of the extrusion is 12-16 ft-lb per inch (640-850 Joules per meter).

10. The method of claim 1 wherein the melt flow index of the alloy is from 3 to 6.

11. The method of claim 1 wherein the specific gravity of the extrusion is from 1.22 to 1.3.

* * * * *